United States Patent Office 3,377,136
Patented Apr. 9, 1968

3,377,136
PROCESS FOR MAKING RADON AND XENON DI- AND TETRAFLUORIDES
Scott I. Morrow, Morris Plains, N.J., assignor to Thiokol Chemical Corporation, Bristol, Pa., a corporation of Delaware
No Drawing. Filed Mar. 29, 1965, Ser. No. 443,628
8 Claims. (Cl. 23—205)

ABSTRACT OF THE DISCLOSURE

Process for preparing noble gas di- and tetrafluorides by contacting dioxygen difluoride with a noble gas to form the fluorinated noble gas product.

This invention involves the preparation of noble gas di- and tetrafluorides.

More particularly, this invention describes a simple process for preparing noble gas fluorides including xenon and radon di- and tetrafluorides. The novel process is advantageous in that it requires only moderate reaction conditions and makes use of available reactants. In addition the reaction can be performed in conventional chemical apparatus. Xenon difluoride prepared by the inventive methods is useful as a reagent for preparing other xenon compounds and as a slow release fluorinating agent.

A number of processes have been described in the art for preparing xenon difluoride. These include the following: direct fluorination of xenon in the gas phase initiated by ultraviolet radiation, the high pressure-high temperature reaction of $SO_2F_2$ and $CF_3OF$ and xenon, the electric discharge activation of xenon in the presence of $CF_4$, the gamma ray or energetic electron radiolysis of xenon-fluorine mixtures. All of these processes require drastic reaction conditions and/or a high energy source for activation.

Ideally, an improved process for producing noble gas di- and tetrafluorides would rely entirely on chemical means, would make use of readily available reactants and would preferably operate under moderate reaction conditions. A process fulfilling all of these conditions would represent a substantial advance in the art.

Thus, it is an object of this invention to prepare xenon difluoride by a novel process utilizing only chemical means and readily available reactants.

Another more general object of this invention is to prepare other noble gas di- and tetrafluorides such as radon difluoride and radon tetrafluoride under moderate reaction conditions.

A further object of this invention is the preparation of xenon difluoride in a high state of purity and having excellent crystal-like habit.

Further objects of this invention will become apparent to those skilled in the art after a further perusal of this patent application.

The above objects among others are achieved by contacting dioxygen difluoride ($O_2F_2$) and a noble gas such as radon or xenon until a substantial amount of noble gas difluoride product is formed. The fluorinated noble gas product is separated from the reactants and any by-products by the usual purification procedures common to synthetic inorganic chemistry. These include sublimation, distillation, chromatography, solvent extraction and the like.

In the favored practice, the reaction is carried out by adding an excess of dioxygen difluoride to xenon, preferably solid xenon, at a temperature of about −100 degrees C. or less. The reaction under these conditions is carried out over a period of 1.5 to 2.5 hours. A white or yellowish solid is obtained which can be stored for extended periods of time. A favored means of removing impurities is to pump the product in vacuo at about −20 degrees C. for several hours and then to continue the pumping while the temperature is allowed to rise to about room temperature. Analysis by X-ray spectroscopy is used to confirm the identity of the product.

The novel process of this invention is advantageous in a number of respects including availability of reactants, flexibility of reaction conditions, simplified process equipment and the purity of the product. The discussion below sets forth some of the salient advantages when xenon is reacted with dioxygen difluoride.

Temperature.—The reaction is preferably run at temperatures of about −100 degrees C. or less because the xenon is solid at the lower temperatures. However, a temperature below about −100 degrees C. can be used if desired. Moreover, where the reaction is run under super-atmospheric pressures, much higher temperatures, even up to about −40 degrees C., can be used. However, while the reaction is operable between −160 to −40 degrees C., convenience favors the temperature range between about −130 to −78 degrees C.

The xenon difluoride product is a relatively stable product which can be maintained at temperatures between about −78 to −20 degrees C. for long periods of time and at near room temperatures briefly.

Pressure.—As indicated, the inventive process is ordinarily conducted at near atmospheric pressure. However, where it is desired to operate at temperatures above those at which xenon is a solid, a closed and pressurized system is desirable. For running the pressurized type of reactions, an autoclave, bomb or sealed vessel is most conveniently utilized. Because of the adidtional costs in equipment and increased hazards involved in high pressure operations, it is preferable to use near atmospheric pressures.

Time.—Under the favored reaction condition of about −100 degrees C. and atmospheric pressure, the reaction time ranges between about 1.5 to 3.5 hours. However, a broader time range of reaction times, 0.25 to 20 hours or more, is possible depending upon the reaction temperature and process used. At the lower temperatures, the reaction time is lengthened while the higher temperatures shorten reaction time proportionately.

Ratio of reactants.—While an excess of dioxygen difluoride to xenon is preferred, the ratio of the two reactants is not critical to the operability of the process. Apparently, an excess as large as 25% of either reactant over the amount required by stoichiometry is not harmful. However, especially favorable results have been obtained when a large excess, 2 to 10 moles of dioxygen difluoride reactant is used for each mole of xenon reactant.

Reactants.—The noble gases and dioxygen difluoride are known compounds. Xenon and radon are commercially available gases. The dioxygen difluoride is prepared by the electrical discharge method of Kirschenbaum and Grosse, J.A.C.S. 81, 1277 (1959). The following embodiments are illustrative of the invention:

In one embodiment, $O_2F_2$ is separately generated by passing an equimolar mixture of $O_2$ and $F_2$ at 10 mm. pressure into contact with a pair of copper electrodes in a Kel F U-trap. The electrodes are charged with 10,000 volts of DC current during the reaction. The trap containing the $O_2F_2$ generator is attached to a similarly shaped U-trap charged with 5.3 parts by weight of xenon which is condensed into the bottom of the trap surrounded by liquid nitrogen. An excess of $O_2F_2$ is generated in the adjacent U-trap and transferred to the reaction containing the now solid xenon being held at about —196 degrees C. Then the trap containing the two reactants is sealed and the temperature in the reactor raised by substituting a —118 degrees C. bath around the reactor. The system is evacuated and the temperature allowed to rise to —118 degrees C. over a period of 2.5 hours. During this time, the pressure in the system builds up from approximately zero pressure to about half an atmosphere and a yellow product appears. The —118 degrees C. bath around the reactor is replaced by one maintained at —78 degrees C. and after a short time, the excess unreacted $O_2F_2$ is seen in the bottom of the reactor. The next day the product is out-gassed for 3 hours in vacuo at —21 degrees C. using a carbon tetrachloride, liquid nitrogen bath. Then the reaction mixture is allowed to come to 25 degrees C. and pumped on in vacuo at 25 degrees C. to remove a volatile xenon containing impurity which is a by-product of the reaction. The reaction product, which is a white powder, is heated at 31–50 degrees C. in a closed evacuated reaction vessel having a chilled zone at the top. A white crystalline product is obtained which, by X-ray analysis and by observation of the crystal habit, is identical to the xenon difluoride obtained by the methods described in the prior art.

In another embodiment of this invention, 15 parts by weight of xenon and 70 parts by weight of $O_2F_2$ are condensed in a bomb type reactor kept at —196 degrees C. by immersion in liquid nitrogen. The reactor is sealed and allowed to come to room temperature by removing the nitrogen bath. The bomb is kept at room temperature for 16 hours, chilled at —196 degrees C., warmed to —78 degrees C., and the volatiles vented off. A white solid is obtained which, upon sublimation under vacuum at 50 degrees C., gives two products; a small quantity of xenon tetrafluoride and a larger quantity of xenon difluoride. The latter is identical to authenticated xenon difluoride.

In yet another embodiment of this invention, the above bomb procedure is repeated using 5 parts by weight of condensed radon gas and 100 parts by weight of condensed $O_2F_2$ and the above pressurized bomb. After 36 hours at 25 degrees C., the bomb is chilled at —196 degrees C., warmed to —78 degrees C., and vented off. A solid product is obtained, which is sublimated under vacuum at 25 degrees C. A product believed to be largely $RnF_2$ with traces of $RnF_4$ is obtained.

As the above embodiments indicate, various changes and modifications can be made in the reactants and still remain within the scope of the inventive process. The metes and bounds of this invention are best described by the claims which follow:

I claim:
1. A process for preparing noble gas di- and tetrafluorides selected from the group consisting of xenon difluoride, xenon tetrafluoride, radon difluoride and radon tetrafluoride, comprising the steps of contacting dioxygen difluoride reactant with a noble gas reactant selected from the group consisting of xenon and radon at a temperature ranging from about —160 to about —40 degrees C. until the fluorinated product is formed and separating the product formed therein from unreacted reactants and by-products.

2. A process for preparing a radon difluoride and radon tetrafluoride product mixture, comprising the steps of contacting excess dioxygen difluoride reactant with radon gas reactant at temperatures ranging from about —160 to —40 degrees C. until the radon product mixture is formed, and separating the product mixture contained therein.

3. A process for preparing radon difluoride product comprising the steps of:
(a) contacting excess dioxygen difluoride reactant with radon gas reactant at temperatures ranging from about —160 to —40 degrees C. until a reaction mixture containing radon difluoride product is formed, said reaction mixtures comprising in addition to the radon difluoride product, unreacted reactants and contaminants,
(b) applying a negative pressure to said reaction mixture,
(c) raising the temperature of the reaction mixture to remove said unreacted reactants and contaminants, and
(d) isolating radon difluoride product remaining therein.

4. A process for preparing radon difluoride comprising the steps of:
(a) condensing excess dioxygen difluoride with radon at a temperature ranging from about —160 to about —40 degrees C. to form a reaction mixture,
(b) raising the temperature of said reaction mixture to a temperature of about —118 to —78 degrees C. until said reaction mixture contains radon difluoride product, reactants, and contaminants,
(c) allowing the temperature of said reaction mixture to rise while under negative pressure to a temperature ranging from —78 to —21 degrees C. until the reactants and contaminants are substantially removed and a solid product residuum remains.
(d) increasing the negative pressure applied to said residuum to at least 760 mm. of mercury to substantially evacuate the solid residuum,
(e) heating said evacuated residuum to about 25 to 60 degrees C. until radon difluoride product sublimes,
(f) condensing said radon difluoride sublimate produced therein.

5. A process for preparing a xenon difluoride and xenon tetrafluoride mixture comprising the steps of contacting dioxygen difluoride reactant with xenon reactant at a temperature ranging from about —160 to about —40 degrees C. until xenon difluoride product is formed and separating the product formed therein from unreacted reactants and by-products.

6. A process for preparing xenon difluoride product comprising the steps of contacting excess dioxygen difluoride reactant with xenon reactant at temperatures ranging from about —160 to —40 degrees C. until xenon difluoride product is formed, and separating the product contained therein.

7. A process for preparing xenon difluoride product comprising the steps of:
(a) contacting excess dioxygen difluoride reactant with xenon reactant at temperatures ranging from about —160 to —40 degrees C. until a reaction mixture containing xenon difluoride product is formed, said reaction mixtures comprising in addition to the xenon difluoride product, unreacted reactants and contaminants,
(b) applying a negative pressure to said reaction mixture,
(c) raising the temperature of the reaction mixture to remove said unreacted reactants and contaminants, and
(d) isolating the xenon difluoride product remaining therein.

8. A process for preparing xenon difluoride comprising the steps of:
(a) condensing excess dioxygen difluoride with xenon at a temperature ranging from about —160 to about —40 degrees C. to form a reaction mixture,
(b) raising the temperature of said reaction mixture to a temperature of about —118 to —78 degrees C. until said reaction mixture contains xenon difluoride product, reactants, and contaminants,
(c) allowing the temperature of said reaction mixture to rise while under negative pressure to a temperature raging from −78 to −21 degrees C. until the reactants and contaminants are substantially removed and a solid product residuum remains, (d) increasing the negative pressure applied to said residuum to at least 760 mm. of mercury to substantially evacuate the solid residuum, (e) heating said evacuated residuum to about 25 to 60 degrees C. until xenon difluoride product sublimes, (f) condensing said xenon difluoride sublimate produced therein.

References Cited

UNITED STATES PATENTS 3,055,817  9/1962  Gordon et al. _____ 23—205 X
3,183,061  5/1965  Claassen et al. _____ 23—205
3,185,548  5/1965  Fields et al. _____ 23—205

EDWARD J. MEROS, *Primary Examiner.*

OSCAR R. VERTIZ, *Examiner.*

G. T. OZAKI, *Assistant Examiner.*